(12) United States Patent
Phillips et al.

(10) Patent No.: US 8,584,823 B2
(45) Date of Patent: Nov. 19, 2013

(54) TORQUE TRANSMITTING ASSEMBLY WITH DOG CLUTCH AND PLATE CLUTCH FEATURES

(75) Inventors: Andrew W. Phillips, Rochester, MI (US); James M. Hart, Belleville, MI (US); Daryl A. Wilton, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 12/972,044

(22) Filed: Dec. 17, 2010

(65) Prior Publication Data

US 2012/0152685 A1    Jun. 21, 2012

(51) Int. Cl.
- *F16D 25/061* (2006.01)
- *F16D 25/0638* (2006.01)
- *F16D 25/10* (2006.01)

(52) U.S. Cl.
USPC .................... 192/48.5; 192/48.612; 192/53.1

(58) Field of Classification Search
USPC ......... 192/48.5, 48.612, 53.1, 85.18; 475/139
See application file for complete search history.

(56) References Cited

U.S. PATENT DOCUMENTS

| | | | | |
|---|---|---|---|---|
| 2,907,428 | A * | 10/1959 | Erwin et al. ................. | 192/48.4 |
| 4,131,185 | A * | 12/1978 | Schall ......................... | 192/53.5 |
| 4,649,771 | A * | 3/1987 | Atkinson et al. ............. | 475/139 |
| 7,108,115 | B2 * | 9/2006 | Ebenhoch et al. .......... | 192/53.1 |

* cited by examiner

*Primary Examiner* — Richard M. Lorence

(57) ABSTRACT

A torque transmitting assembly for selectively transmitting torque between a first member and a second member includes a plate clutch interconnected between the first member and the second member, the plate clutch having a maximum torque capacity limited to enabling full throttle single-transition up-shifts in the transmission when the plate clutch is fully engaged. A dog clutch is connected to the first member and selectively connected to the second member. The dog clutch is in frictional engagement with the plate clutch when the plate clutch is engaged, and the dog clutch is connected to the second member prior to the transmitted torque exceeding the maximum torque capacity of the plate clutch.

10 Claims, 4 Drawing Sheets

TORQUE TRANSMITTING ASSEMBLY WITH DOG CLUTCH AND PLATE CLUTCH FEATURES

FIELD

The invention relates generally to a torque transmitting device having a dog clutch and a plate clutch, and more particularly to a torque transmitting device having a dog clutch and a minimum capacity plate clutch to provide power-on upshifts.

BACKGROUND

The statements in this section merely provide background information related to the present disclosure and may or may not constitute prior art.

A typical multi-speed automatic or hybrid transmission uses a combination of torque transmitting devices, such as clutches or brakes, to achieve a plurality of forward and reverse gear or speed ratios. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

These torque transmitting devices generally include plate clutches or dog clutches typically used in manual transmissions. Plate clutches are typically designed for sufficient torque capacity for all engaged operating conditions of the transmission and are accordingly robust. However, typical plate clutches often require substantial packaging space and may create problems with smooth engagement under light torque loads and can also contribute to substantial spin losses. In contrast, dog clutches have near zero spin losses but cannot be used for power-on up-shifts due to lacking torque capacity prior to full engagement which yields an inability to absorb energy and synchronize speed before engagement. Accordingly, there is a need in the art for a torque transmitting assembly that combines the features of the plate clutch, e.g. able to provide power-on up-shifts, with the features of the dog clutch, e.g. minimized packaging, minimized spin loss, and robust torque capacity.

SUMMARY

A torque transmitting assembly is provided for selectively transmitting torque between a first member and a second member in a transmission of a motor vehicle.

In one embodiment, the torque transmitting device includes a plate clutch interconnected between the first member and the second member, the plate clutch having a maximum torque capacity limited to enabling full throttle single-transition up-shifts in the transmission when the plate clutch is fully engaged. A dog clutch is connected to the first member and selectively connected to the second member. The dog clutch is in frictional engagement with the plate clutch when the plate clutch is engaged, and the dog clutch is connected to the second member prior to the transmitted torque exceeding the maximum torque capacity of the plate clutch.

In another embodiment, a piston is hydraulically translatable to contact the plate clutch in order to engage the plate clutch and the dog clutch.

In yet another embodiment, the plate clutch includes a reaction disc slidably connected to a support and a friction disc slidably connected to the second member, wherein the support is supported by the piston and the dog clutch.

In yet another embodiment, the dog clutch is in frictional engagement with the friction disc when the piston contacts and translates the plate clutch.

In yet another embodiment, a biasing member contacts the dog clutch and is configured to bias the dog clutch to disengage with the second member and to disengage the plate clutch.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
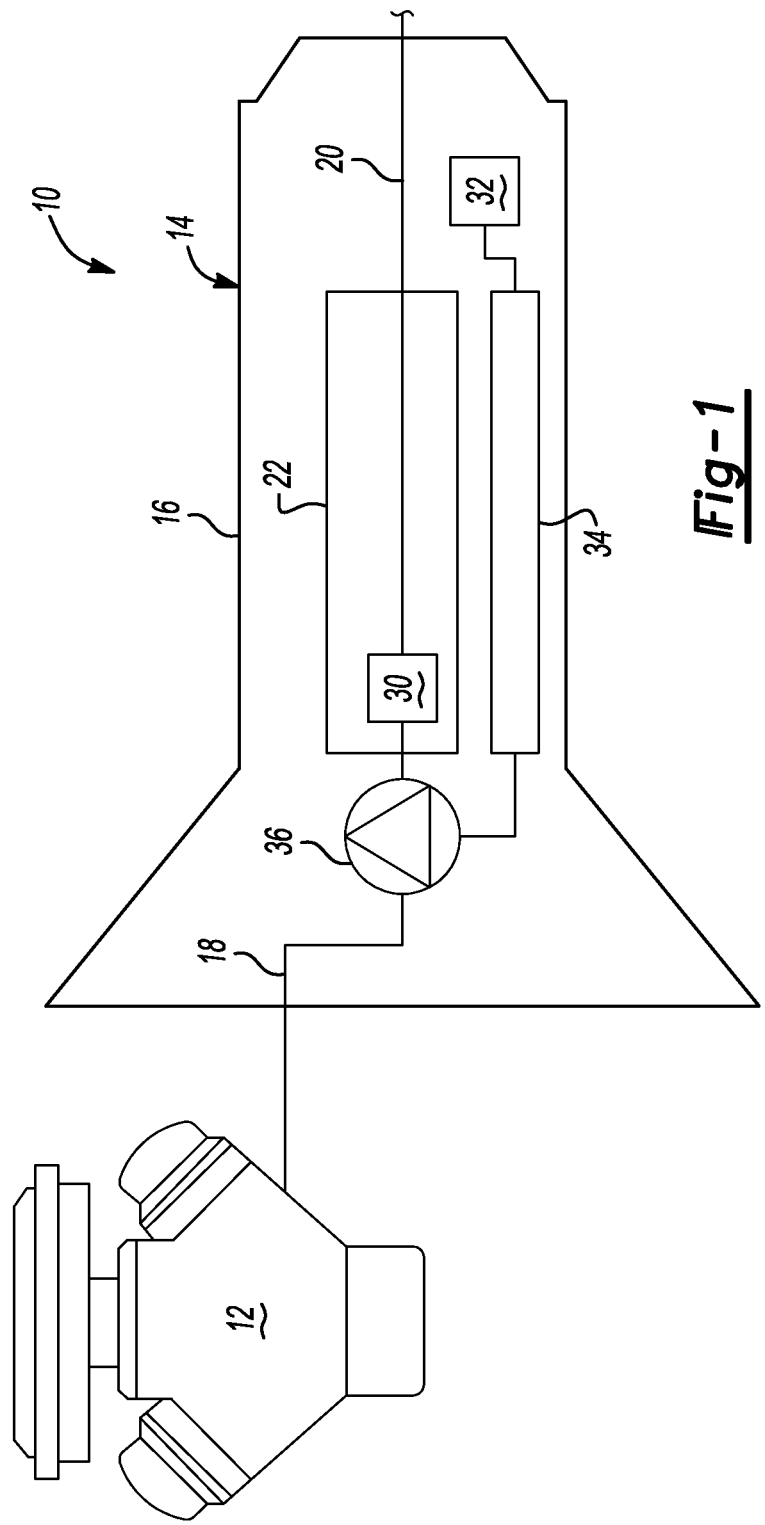
FIG. 1 is an exemplary schematic of a powertrain in a motor vehicle.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes a transmission input shaft 18, a transmission output shaft 20, and a gear and clutch arrangement 22. It should be appreciated that while the transmission 14 is illustrated as a rear wheel drive transmission, the transmission 14 may have other configurations without departing from the scope of the present disclosure. The transmission input shaft 18 is connected with the engine 12 and receives input torque or power from the engine 12. The transmission output shaft 20 is preferably connected with a final drive unit (not shown) which may include, for example, propshafts, differential assemblies, and drive axles. The transmission input shaft 18 is coupled to and provides drive torque to the gear and clutch arrangement 22.

The gear and clutch arrangement 22 includes a plurality of gear sets and a plurality of shafts. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes at least one torque transmitting assembly 30. The torque transmitting mechanism 30 is selectively engageable to initiate at least one of a plurality of gear or speed ratios by selectively coupling individual gears within the plurality of gear sets to the plurality of shafts. The torque transmitting assembly 30 will be described in greater detail below.

The transmission 14 also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the torque transmitting assembly 30 via a hydraulic control system 34. The hydraulic control system 34 is operable to selectively engage the torque transmitting assembly 30 by selectively communicating a hydraulic fluid to the torque transmitting assembly 30 that engages the torque transmitting device. The hydraulic fluid is communicated to the torque transmitting assembly 30 under pressure from a pump 36 that is driven by the engine 12 in the example provided. The pump 36 may be of various types, for example, a gear pump, a vane pump, a gerotor pump, or any other positive displacement pump.

Figure 2:
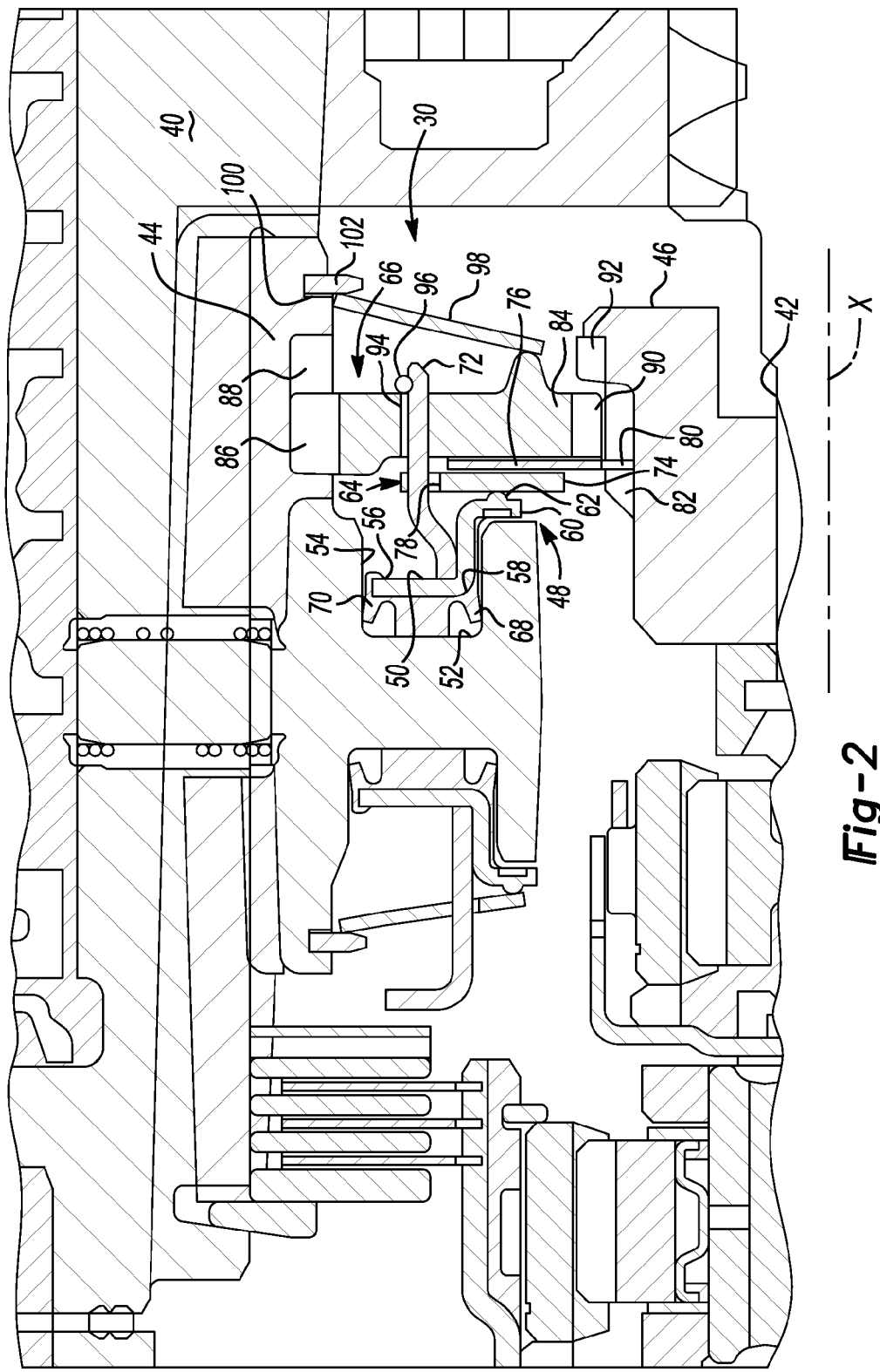
FIG. 2 is a sectional view of a portion of a torque transmitting assembly in a first position and an exemplary transmission according to the principles of the present invention.

With reference to FIG. 2, the torque transmitting assembly 30 according to the principles of the present invention is illustrated in operative association with a first component or member 40 and a second component or member 42 within the transmission 10. The torque transmitting assembly 30 is operable to transmit torque between the first component 40 and the second component 42. In the example provided, the first component 40 is a stationary housing and the second component 42 is a rotatable shaft or member. However, it should be appreciated that either of the components 40 and 42 may be, for example, a transmission case or housing, a gear, or any other component in a transmission. Accordingly, in the example provided, the torque transmitting assembly 30 is a brake, though it should be appreciated that the torque transmitting assembly 30 may be a clutch without departing from the scope of the present invention.

The torque transmitting assembly 30 generally includes a housing 44, a hub 46, and a torque transmitting device 48. The clutch housing 44, the hub 46, and the torque transmitting device 48 are coaxial with one another and define an axis "X". The hub 46 is rotatable about the axis "X".

The torque transmitting device 48 is disposed within the clutch housing 44 and radially between the clutch housing 44 and the hub 46. The torque transmitting device 48 includes a piston 50 disposed within an annular pocket 52 formed in an inside surface 54 of the clutch housing 44. The piston 50 includes a radially extending disc portion 56, an axially extending annulus 58, and a radially extending apply member 60. The disc portion 56, the annulus 58, and the apply member 60 are constructed as a unitary, solid piece in the example provided. The apply member 60 includes an apply face 62 that faces axially towards two clutch elements 64 and 66 which will be described in greater detail below. The apply face 62 is preferably annular and planar. Inner and outer seals 68 and 70, respectively, seal the piston 50 to the annular pocket 52. The piston 50 is hydraulically actuatable to slide or translate within the annular pocket 52 in a direction towards the clutch elements 64 and 66 to an engaged position and to slide or translate away from the clutch elements 64 and 66 to a disengaged position.

Coupled to the piston 50 is a support disc 72. The support disc 72 extends substantially axially away from the piston 50 and supports the first element 64, as will be described in greater detail below. The support disc 72 is discontinuous as further described below.

The first clutch element 64 includes a reaction plate 74 and a friction disc 76. The reaction plate 74 is connected to and supported by the support disc 72. For example, the reaction plate 74 includes a slot or aperture 78 that receives the support disc 72 therethrough. Therefore, the reaction plate 74 is rotationally fixed to the support disc 72, the piston 50, and the clutch housing 44 and is axially translatable along the axis "X" by the piston 50. The friction plate 76 includes splines 80 meshed with a first set of grooves 82 formed on an outer surface of the hub 46. Therefore, the friction plate 76 is rotationally fixed to the hub 46 but is axially translatable along the axis "X".

The second clutch element 66 includes a dog clutch 84 disposed adjacent the friction disc 76. The dog clutch 84 includes outer splines 86 meshed with grooves 88 formed and inner teeth 90 that are selectively engageable with a second set of grooves 92 formed on the outer surface of the hub 46. Therefore, the dog clutch 84 is rotationally fixed to the clutch housing 44 but is axially translatable along the axis "X". The dog clutch 84 further includes a compliment of openings or apertures 94 that receive portions of the support disc 72. Portions of the support disc 72 extend through the openings 94 and are retained to the dog clutch 84 via a retaining device 96.

The torque transmitting assembly 30 further includes a return spring 98 disposed adjacent the dog clutch 84. The return spring 98 is fixed at an end thereof by a retainer ring 102 disposed within a groove 100 formed in the inner surface 54 of the clutch housing 44. The return spring 98 is positioned to bias the dog clutch 84 axially away from the second set of grooves 92. It should be appreciated that the return spring 98 may be retained in any number of different ways without departing from the scope of the present invention.

Figure 3:
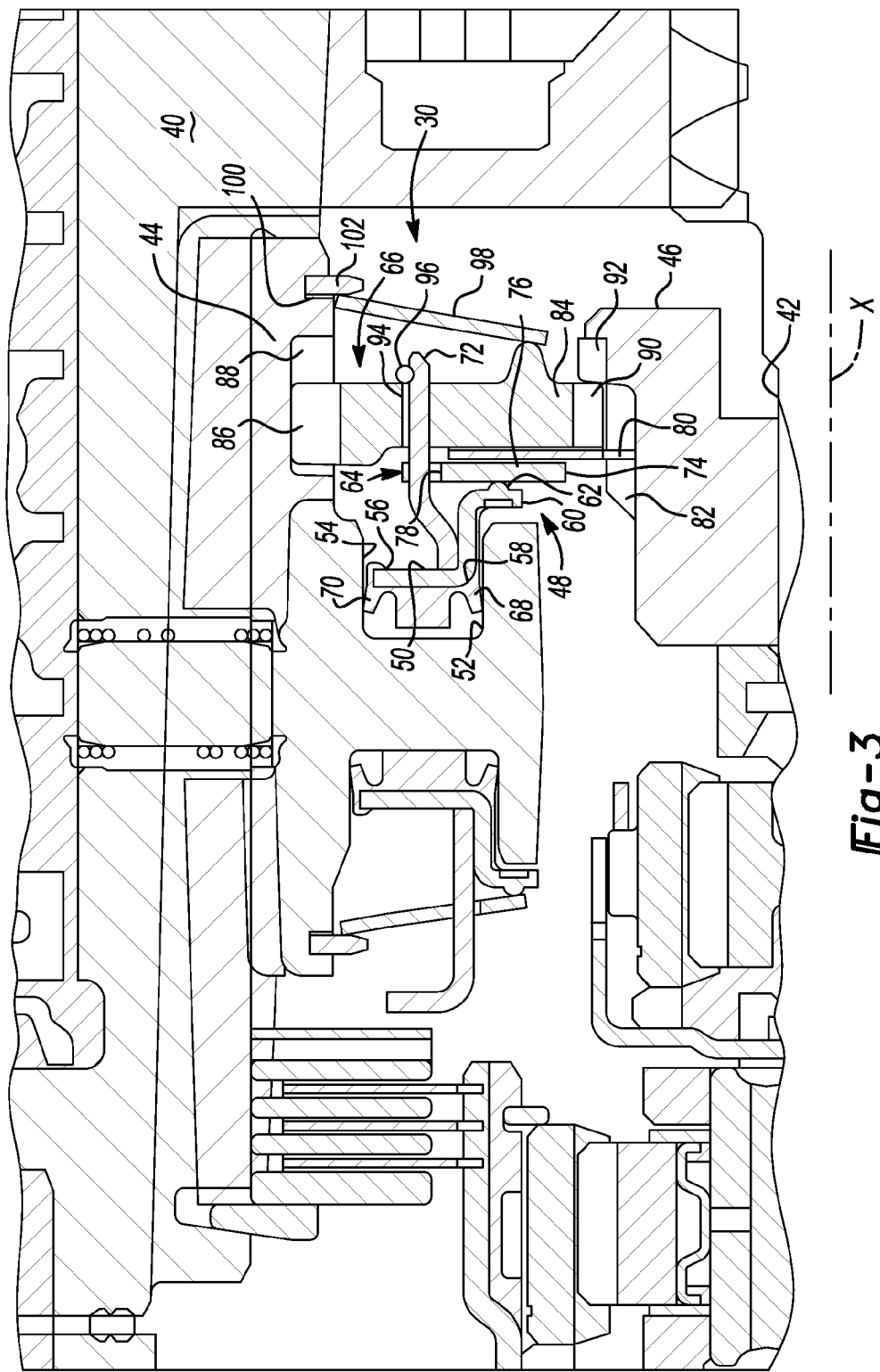
FIG. 3 is a sectional view of a portion of a torque transmitting assembly in a second position and an exemplary transmission according to the principles of the present invention.

To engage the torque transmitting assembly 30, the piston 50 is actuated by a flow of pressurized hydraulic fluid on an apply side of the piston 50. The piston 50 translates in an axial direction towards the first clutch element 64 against the bias of the spring 98. The apply face 62 of the piston 50 contacts the reaction plate 74 and moves the reaction plate 74 relative to the support disc 72 towards the friction plate 76. In a first engaged position, shown in FIG. 3, the first clutch element 64 is engaged while the second clutch element 66 is not engaged. In this condition, torque is transferred through the clutch housing 44, the spline 88, spline 86 dog clutch 84, friction disc 76 to hub 46. During this state force is applied through the piston 50, the reaction plate 74, the friction disc 76, the dog clutch 84, the bias spring 98, the retainer 102, and into the clutch housing 44. The first clutch element 64 is configured to have a torque capacity that allows power-on (full-throttle single-transition) up-shifts by the transmission 14. This is accomplished by tuning the stiffness of bias spring 98 so that the force applied is high enough to allow the friction disc 76 to absorb energy but low enough to allow the bias spring 98 to prevent engagement of splines 90 and 92. In addition, as the load through the first clutch element 64 increases as the piston 50 translates, the dog clutch 84 is rotationally synchronized with the friction disc 76 and therefore the hub 46.

Figure 4:
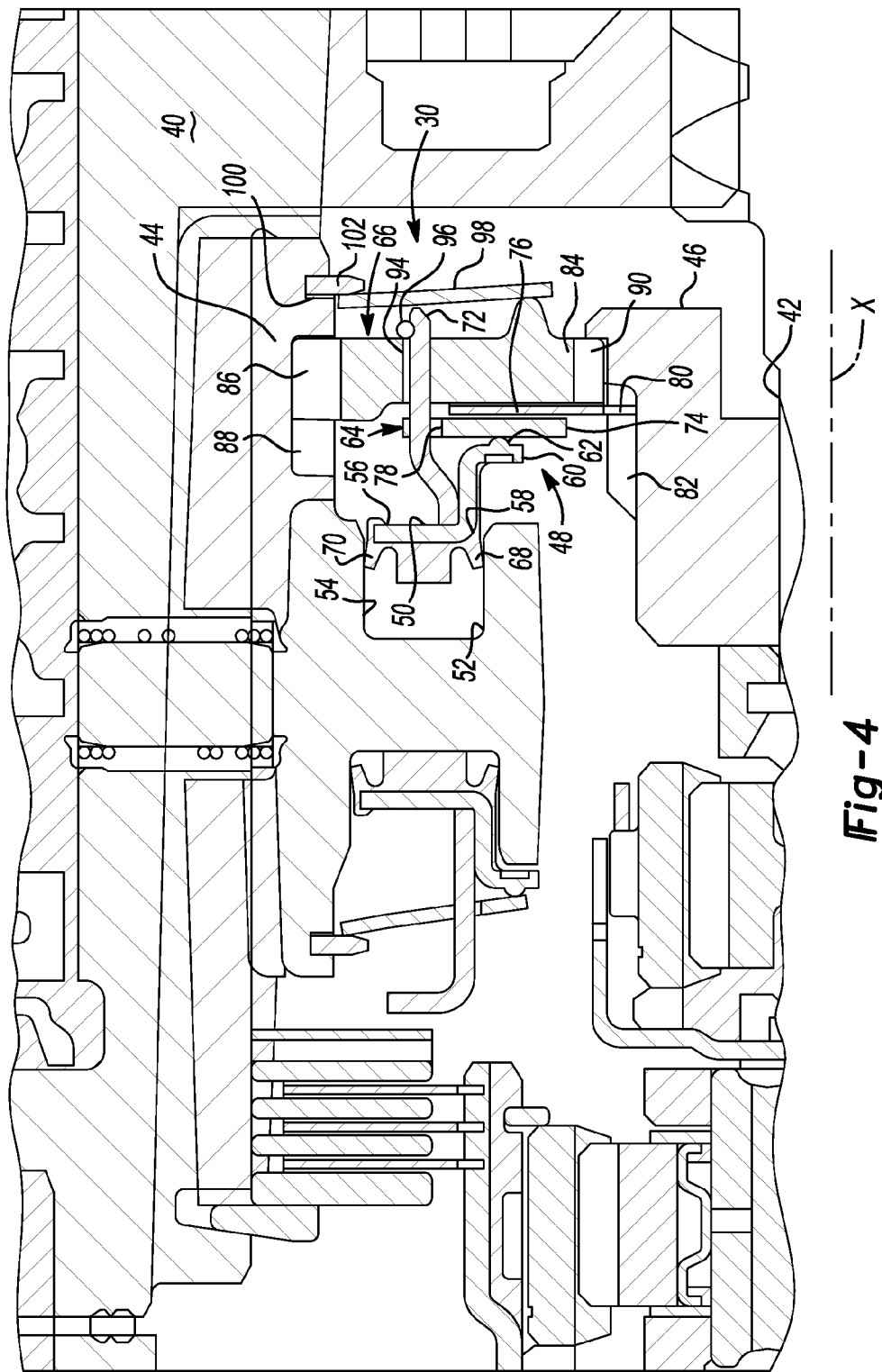
FIG. 4 is a sectional view of a portion of a torque transmitting assembly in a third position and an exemplary transmission according to the principles of the present invention.

As the piston 50 continues to translate, and prior to the first clutch element 76 exceeding its maximum torque capacity, the dog clutch 84 engages the hub 46 via the second set of grooves 92, as shown in FIG. 4. In this condition, the torque capacity of the torque transmitting assembly 30 is governed by the torque capacity of the dog clutch 84. This device advantageously capitalizes on the ability modern powertrain control systems now have to allow for acute control of engine torque during shift events. This reduces the amount of shift energy which must be dissipated thereby requiring fewer clutch plates for thermal management. During clutch release events, the dog clutch 84 shall be released thereby allowing the friction disc 76 to provide a smooth release of torque capacity.

To disengage the torque transmitting assembly 30, the apply side of the piston 50 is depressurized, and the return spring 98 moves the dog clutch 84, and therefore the support disc 72 and piston 50 back to the unengaged position, thereby de-coupling the clutch housing 44 from the hub 46.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque transmitting device for selectively transmitting torque between a first member and a second member in a transmission of a motor vehicle, the torque transmitting device comprising:
   a plate clutch interconnected between the first member and the second member, the plate clutch having a maximum torque capacity limited to enabling full throttle single-transition up-shifts in the transmission when the plate clutch is fully engaged;
   a dog clutch connected to the first member and selectively connected to the second member, the dog clutch in frictional engagement with the plate clutch when the plate clutch is engaged, and wherein the dog clutch is connected to the second member prior to the transmitted torque exceeding the maximum torque capacity of the plate clutch; and
   a piston hydraulically translatable to contact the plate clutch in order to engage the plate clutch and the dog clutch.

2. The torque transmitting device of claim 1 wherein the plate clutch includes a reaction disc slidably connected to a support and a friction disc slidably connected to the second member, wherein the support is supported by the piston and the dog clutch.

3. The torque transmitting device of claim 2 wherein the dog clutch is in frictional engagement with the friction disc when the piston contacts and translates the plate clutch.

4. The torque transmitting device of claim 1 further comprising a biasing member that contacts the dog clutch and is configured to bias the dog clutch to disengage with the second member and to disengage the plate clutch.

5. A torque transmitting assembly comprising:
   a housing that defines an axis;
   a hub coaxial with the housing and having a plurality of grooves;
   a piston slidable disposed within the housing, the piston translatable parallel to the axis between at least a first and a second position;
   a support supported by the piston;
   a reaction plate slidably disposed on the support;
   a friction disc slidably disposed on the hub and located axially adjacent the reaction plate;
   a dog clutch slidably connected to the housing and selectively connectable with the plurality of grooves of the hub, the dog clutch located axially adjacent the friction disc; and
   a biasing member adjacent the dog clutch and configured to bias the dog clutch towards the piston,
   wherein the piston contacts and translates the reaction plate to rotationally couple the reaction plate and the dog clutch with the friction disc when in the first position, and wherein the piston contacts the reaction plate and translates the reaction plate, friction disc, and the dog clutch to rotationally couple the dog clutch with the hub when in the second position.

6. The torque transmitting assembly of claim 5 wherein the piston is moved from the first position to the second position by hydraulic fluid acting on the piston.

7. The torque transmitting assembly of claim 5 wherein the reaction plate, friction disc, and dog clutch have a maximum torque transfer capacity when the piston is in the first position, and wherein the dog clutch is engaged with the hub prior to a torque transfer through the reaction plate, friction disc, and dog clutch exceeding the maximum torque transfer capacity.

8. The torque transmitting assembly of claim 5 wherein the reaction plate and the dog clutch each have an opening that receives the support therethrough.

9. The torque transmitting assembly of claim 5 wherein the hub includes a second plurality of grooves, and the friction disc is rotationally connected to the second plurality of grooves.

10. A torque transmitting device for selectively transmitting torque between a first member and a second member in a transmission of a motor vehicle, the torque transmitting device comprising:
    a plate clutch interconnected between the first member and the second member;
    a dog clutch connected to the first member and selectively connected to the second member, the dog clutch in frictional engagement with the plate clutch when the plate clutch is engaged; and
    a piston hydraulically translatable to contact the plate clutch in order to engage the plate clutch and the dog clutch.

* * * * *